(12) United States Patent
Bush

(10) Patent No.: US 12,003,627 B2
(45) Date of Patent: Jun. 4, 2024

(54) COMMUNICATION SYSTEM AND METHOD FOR APPLYING QUANTUM KEY DISTRIBUTION SECURITY FOR A TIME SENSITIVE NETWORK

(71) Applicant: General Electric Company, Schenectady, NY (US)

(72) Inventor: Stephen Francis Bush, Latham, NY (US)

(73) Assignee: General Electric Company, Schenectady, NY (US)

( * ) Notice: Subject to any disclaimer, the term of this patent is extended or adjusted under 35 U.S.C. 154(b) by 617 days.

(21) Appl. No.: 16/569,451

(22) Filed: Sep. 12, 2019

(65) Prior Publication Data

US 2021/0083867 A1    Mar. 18, 2021

(51) Int. Cl.
*H04L 9/08* (2006.01)
*G06N 10/00* (2022.01)
*H04L 45/121* (2022.01)
*H04L 49/253* (2022.01)

(52) U.S. Cl.
CPC .......... *H04L 9/0858* (2013.01); *G06N 10/00* (2019.01); *H04L 9/0819* (2013.01); *H04L 9/0852* (2013.01); *H04L 9/0855* (2013.01); *H04L 45/121* (2013.01); *H04L 49/254* (2013.01)

(58) Field of Classification Search
CPC ....... H04L 1/1887; H04L 67/12; H04L 47/10; H04L 1/1812; H04L 47/28; H04L 45/121; H04L 49/254; H04L 9/0852; H04L 9/0858; H04L 9/0855; H04L 9/0819; G06N 10/00
See application file for complete search history.

(56) References Cited

U.S. PATENT DOCUMENTS

| | | |
|---|---|---|
| 7,200,768 B2 | 4/2007 | Andersson et al. |
| 8,781,129 B2 | 7/2014 | Bush et al. |
| 9,099,858 B2 | 8/2015 | Bush et al. |
| 9,912,585 B2 | 3/2018 | Korhonen et al. |
| 10,205,784 B2 | 2/2019 | Bush et al. |
| 10,218,628 B2 | 2/2019 | Bush |
| 10,298,503 B2 | 5/2019 | Bush et al. |

(Continued)

FOREIGN PATENT DOCUMENTS

| | | | | |
|---|---|---|---|---|
| CN | 107508671 A | * | 12/2017 | ........... H04L 45/121 |
| CN | 108768888 A | * | 11/2018 | ............. H04L 47/56 |

(Continued)

OTHER PUBLICATIONS

Y. Cao, Y. Zhao, Y. Wu, X. Yu and J. Zhang, "Time-Scheduled Quantum Key Distribution (QKD) Over WDM Networks," in Journal of Lightwave Technology, vol. 36, No. 16, pp. 3382-3395, 15 Aug. 15, 2018 (Year: 2018).*

Takeoka, M., Guha, S. & Wilde, M. "Fundamental rate-loss tradeoff for optical quantum key distribution", Oct. 24, 2014, Nature Communications, 5, 5235 (2014). (Year: 2014).*

(Continued)

*Primary Examiner* — Farid Homayounmehr
*Assistant Examiner* — Zhimei Zhu
(74) *Attorney, Agent, or Firm* — Armstrong Teasdale LLP

(57) ABSTRACT

A method includes identifying connections between plural components of a time sensitive network (TSN) that are interconnected via a predetermined connection plan. The method also includes determining quantum key distribution (QKD) information of the components. Also, the method further includes scheduling flows for the TSN based on the QKD information of the components.

18 Claims, 3 Drawing Sheets

(56) References Cited

U.S. PATENT DOCUMENTS

| | | | |
|---|---|---|---|
| 2007/0230688 A1* | 10/2007 | Tajima | H04L 9/0858 380/30 |
| 2009/0106848 A1 | 4/2009 | Coley | |
| 2011/0182428 A1* | 7/2011 | Zhao | H04L 9/0852 380/256 |
| 2018/0006956 A1 | 1/2018 | Bush et al. | |
| 2018/0090988 A1 | 3/2018 | Maccleery et al. | |
| 2018/0132234 A1 | 5/2018 | Cavalcanti et al. | |
| 2018/0237039 A1* | 8/2018 | Mong | B61L 23/005 |
| 2018/0237040 A1* | 8/2018 | Mong | H04L 67/61 |
| 2019/0123847 A1 | 4/2019 | Bush et al. | |
| 2020/0358606 A1* | 11/2020 | Zhao | H04L 9/12 |

FOREIGN PATENT DOCUMENTS

| | | | | |
|---|---|---|---|---|
| CN | 109194468 A * | 1/2019 | | H04B 10/29 |
| EP | 3488570 A1 | 5/2019 | | |
| WO | WO-2007055683 A2 * | 5/2007 | | H04L 9/0858 |
| WO | WO-2018015425 A1 * | 1/2018 | | H04L 45/121 |

OTHER PUBLICATIONS

Junjia Qi et al, .; "Cybersecurity for distributed energy resources and smart inverters", IET Cyber-Physical Systems: Theory & Applications, IET Cyber-Phys. Syst., Theory Appl., 2016, vol. 1, Iss. 1, pp. 28-39, 12 pages.

Zhou et al., "Analysis and modeling of asynchronous traffic shaping in time sensitive networks", Jun. 13-15, 2018, Conference Location: Imperia, Italy.

* cited by examiner

COMMUNICATION SYSTEM AND METHOD FOR APPLYING QUANTUM KEY DISTRIBUTION SECURITY FOR A TIME SENSITIVE NETWORK

FIELD

Embodiments of the present disclosure generally relate to systems and methods for communicating data in networks, and security for communicating data in networks.

BACKGROUND

Various types of control systems communicate data between or among different components in order to enable control operations of powered systems. For example, locomotives, automobiles, surgical suites, power plants, etc., include many systems that communicate with each other in order to control operations of the locomotives, automobiles, surgical suites, and power plants.

The operations of these powered systems may rely on on-time and accurate delivery of data frames among various devices. Failure to deliver some data at or within designated times may result in failure or reduced effectiveness of the powered system. Without timely information, feedback control systems cannot maintain performance and stability.

Aspects of control systems (e.g., components or groups of components that form part of a network such as a power grid) may be subject to external security risks. Various cybersecurity measures may be implemented over such a network; however, such measures may require a large amount of processing resources and/or not provide a desired level of security.

BRIEF DESCRIPTION

In one embodiment, a method includes identifying connections between plural components of a time sensitive network (TSN) that are interconnected via a predetermined connection plan. The method also includes determining quantum key distribution (QKD) information of the components. Also, the method further includes scheduling flows for the TSN based on the QKD information of the components.

In one embodiment, a scheduler is configured for use with a time sensitive network (TSN). The scheduler includes one or more processors configured to identify connections between plural components of the TSN that are interconnected via a predetermined connection plan; determine quantum key distribution (QKD) information of the components; and schedule flows for the TSN based on the QKD information for the components.

In one embodiment, a system includes a time sensitive network (TSN), plural quantum key distribution (QKD) devices, a scheduler, and a communication network. The TSN includes plural components that are interconnected via a predetermined connection plan. The QKD devices are associated with the plural components of the TSN. The scheduler is configured for use with the TSN, and includes one or more processors configured to identify connections between the plural components of the TSN that are interconnected via a predetermined connection plan; determine quantum key distribution (QKD) information of the components; and schedule flows for the TSN based on the QKD information for the components. The communication network couples the scheduler and the TSN.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the present disclosure provide systems and methods that efficiently schedule flows for components of a time sensitive network (TSN) that utilizes quantum key distribution (QKD) security techniques, such as, for example, a power grid. Various embodiments utilize information describing or depicting QKD characteristics and/or capabilities to schedule flows in a TSN to efficiently implement QKD. Various embodiments provide improved application of cybersecurity to TSN flows. In contrast to certain conventional approaches that apply cybersecurity equally to all power grid components, various embodiments provide for more efficient allocation of cybersecurity resources.

Generally, QKD utilizes a quantum channel or fiber to distribute cryptographic keys for use in securing messages. Quantum mechanics of photons are used to generate and distribute keys. Because observation of a quantum system disrupts the system, eavesdroppers may be reliably detected. However, it may be noted that QKD-protected flows in a network will have different constraints than conventional networks, including frame or message size, or message transmission time, time to obtain and insert a key, or the like. For example, variations in key length can impact the frame size and the corresponding TSN schedule. Various embodiments factor QKD related considerations into the scheduling of flows. In various embodiments, the impact of delay and/or variability of QKD security requirements may be computed and included in the scheduling process, allowing, for example, selection of a trade-off between latency, determinism, and security.

For example, QKD keys may have a distance versus key generation rate trade-off. Accordingly, in various embodiments, the physical length of a communicative path between components may be selected to achieve a desired key update rate for a TSN flow. For example, a physically shorter path may be selected to achieve a faster key rate.

Figure 1:
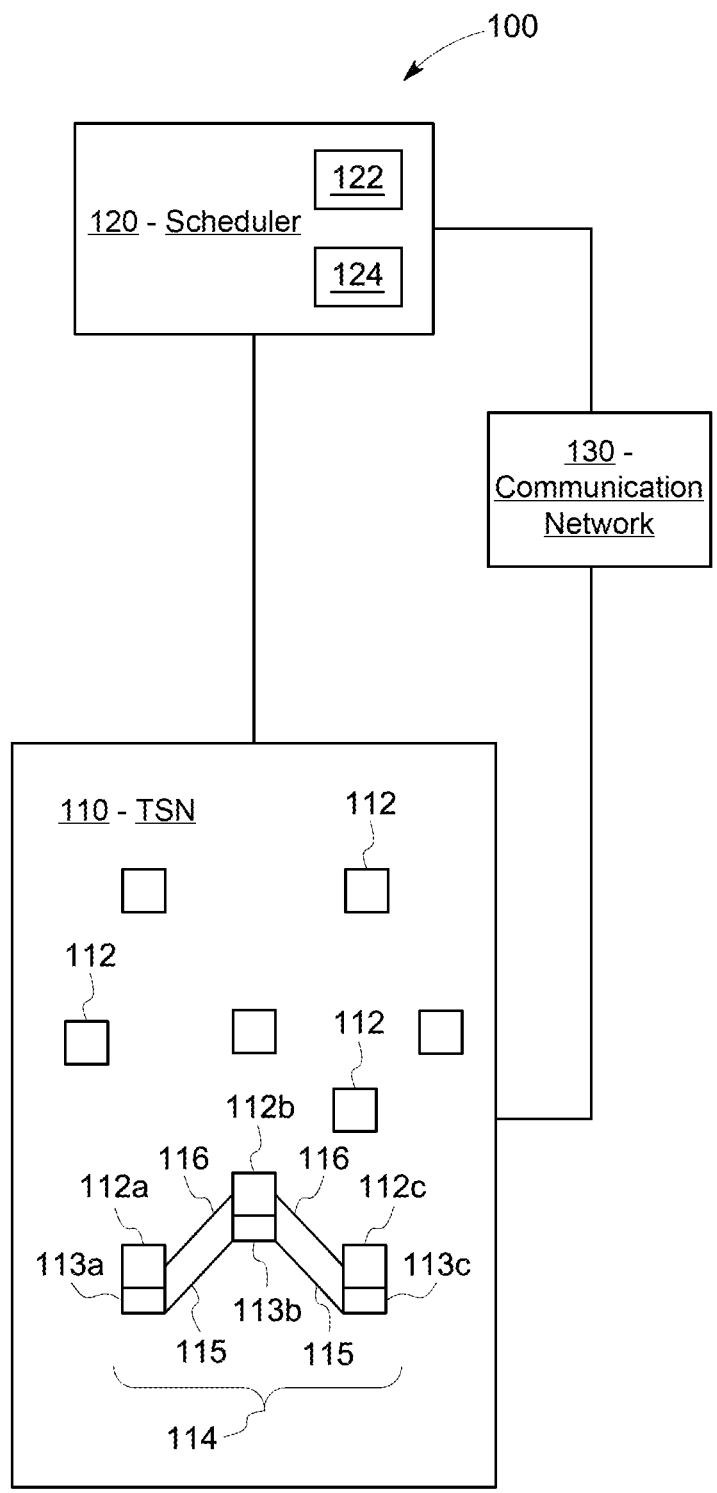
FIG. 1 provides a block diagram of an example system according to one or more embodiments of subject matter described herein.

FIG. 1 provides a block diagram of an example system 100 that includes a time sensitive network (TSN) 110, a scheduler 120, and a communication network 130. Generally, the scheduler 120 is configured to schedule flows (communication flows) for the TSN 110, and the communication network 130 couples the scheduler 120 and TSN 110. The depicted system 100 also includes plural quantum key distribution devices 113 that are associated with plural components 112 of the TSN 110. Generally, the quantum key distribution devices 113 generate quantum keys and distribute quantum keys to components 112 to provide security for communications between the components 112.

The TSN 110 includes plural components 112 that are interconnected via a predetermined power connection plan. Generally, the TSN 110 is configured and/or operated so that commands or other communications are provided to the various components 112 in a highly synchronized manner (e.g., with nanosecond precision). In various embodiments, the communications may include priority communications and best effort communications, with the priority communications given a higher priority than the best effort communications, and the best effort communications performed when possible without interrupting or impeding the best effort communications. The TSN 110 may be configured for example, as a power grid. As another example, the TSN 110 may be an engine control system for a vehicle.

Generally, in various embodiments, the TSN 110 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The TSN 110 can be an Ethernet based network that communicates different categories or groups or types of data according to different priorities. For example, the TSN 110 can communicate time sensitive data according to the schedule or schedules determined by the scheduler 120. The time sensitive data is communicated at designated times or within designated time periods, while best effort traffic and/or rate constrained traffic is attempted to be communicated in a timely manner, but that may be delayed in order to ensure that the time sensitive data is communicated to achieve or maintain a desired quality of service.

In the illustrated example, the depicted TSN 110 is a power grid, and includes components 112. The components 112 are interconnected to each other via a predetermined power connection plan that defines which components 112 are connected to each other to provide power or perform another task of the power grid. The various components 112 may be connected to each other via a hardwired Ethernet connection.

The various aspects of the system 100 interact with each other to generate a schedule for the TSN 110. For example, the components 112 may include intelligent electronic devices that communicate their communication interface, connectivity information, and QKD information related to associated QKD devices to the scheduler 120 via the communication network 130, where the connectivity information includes both power connectivity and network connectivity. Also, power grid goals (e.g., remedial action plans) may be communicated to the scheduler 120 from the TSN 110. Further, network connectivity information may be communicated to the scheduler 120 (e.g., via the communication network 130). Then, the scheduler 120 computes TSN flow schedules that enforce QKD security constraints to protect TSN flows that impact power stability. The scheduler 120 may achieve security goals, for example, by selecting appropriate paths or routes for interconnected or associated components to provide less vulnerable paths for higher priority components, and/or by assigning more robust security techniques (e.g., larger number of keys) for higher priority components. Paths or routes for communicatively coupling particular components may be selected to provide a physical route that is conducive to desired QKD characteristics (e.g., physically shorter paths for components for which faster key update rates are desired).

In practice, a large number of components 112 (and QKD devices 113) may be present in the TSN 110, with different groups of the components 112 (and associated QKD devices 113) connected with each other. Only one example of a connection is shown in FIG. 1 for clarity of illustration, but it may be noted that many connections may be included in the TSN 110.

In the illustrated example, a path 114 includes a relay controller 112a, a power relay 112b, and an egress gate 112c. The relay controller 112a is used to control the power relay 112b. For example, the relay controller 112a may be used to control the power relay 112b to provide power at a given location and/or perform a responsive action. The egress gate 112c controls whether the path 114 is actively communicating or not. The egress gate 112c is generally closed, but may be opened to provide communication along, to, or from the path 114. Generally, only one egress gate in the TSN 110 is open at a given time to avoid confusion of communication from one path with any other path.

As discussed herein, QKD devices 113 may be incorporated with, coupled to, or otherwise associated with corresponding components 112. For example, in the illustrated example, a first QKD device 113a is associated with the relay controller 112a, a second QKD device 113b is associated with the power relay 112b, and a third QKD device 113c is associated with the egress gate 112c. Each QKD device 113 is configured to generate and/or distribute a quantum key for use in communicating with its associated component 112. Each QKD device 113 may be communicatively coupled with at least one associated component 112 to provide the associated component 112 with a cryptographic key that has been generated and communicated between QKD devices 113. It may be noted that in various embodiments QKD devices 113 may be stand alone devices that are coupled with or associated with corresponding components. For example, a QKD device 113 may include rack mounted components in a dedicated case that are coupled to an associated component or endpoint of a route. In other embodiments, a QKD device 113 may form a portion of a corresponding component 112, housed in a common housing with the corresponding component 112, or otherwise integrated with the corresponding component 112.

In the illustrated example, the path 114 includes a message channel 116 and a quantum channel 115. The scheduler 120 in various embodiments specifies paths that include components and associated QKD devices, including message channels that communicatively couple components 112 and quantum channels that provide a conduit for photons to travel between QKD devices. For example, the quantum channel 115 may be configured as a fiber or free space quantum channel between QKD devices. In various embodiments, the message channel 116 may be configured as a hard-wired Ethernet communication channel between components 112. It may be noted that in the depicted example, each component 112a, 112b, 112c has an associated QKD device 113a, 113b, 113c, respectively; however in various embodiments, some components (e.g., components for which QKD security is unnecessary or undesired) may not have an associated QKD device. It may be noted that the message channel 116 and the quantum channel 115 in the illustrated example are on separate physical structures; however, in various embodiments the quantum channel 115 and the message channel 116 may share the same fiber.

The scheduler 120 in the illustrated example determines or schedules communication flows between various components 112 and QKD devices 113 along paths or routes (e.g., path 114). For example, the scheduler may identify groups of components 112 that need to communicate with each other, and which associated QKD devices 113 will be utilized to facilitate the use of QKD with each group of components 112. Generally, the scheduler 120 determines which components 112 and QKD devices need to communicate with each other and schedules appropriate communication flows between components 112 to provide the required communication. The scheduler 120, for example, may include a tool that is programmed or configured to look at a power grid network and identify relays and other components that need to communicate with each other. The scheduler 120 then schedules which components 112 and QKD devices 113 communicate with each other along with the route or path as well as the timing of communications among each connected group of components 112. Various paths or routes may be prioritized (e.g., priority paths given higher priority over best efforts paths). After the various connections between the components 112 are identified, message types and required times for the messages (including time for the generation, distribution, and use of quantum keys used in conjunction with the messages) may be populated into a schedule prepared by the scheduler 120. In some embodiments the scheduler 120 is coupled to the TSN 110 before a time of implementation of the TSN 110, and may not be coupled to the TSN 110 during operation of the TSN 110. Alternatively or additionally, the scheduler 120 may be coupled to the TSN 110 continuously or intermittently during operation of the TSN 110 and may be used to dynamically update the schedule and/or periodically update the schedule.

In the illustrated embodiment the scheduler 120 includes a processor 122 and a memory 124. It may be noted that only one processor 122 and one memory 124 are shown for ease of depiction in FIG. 1. However, the block 122 may represent more than one processor and the block 124 may represent more than one memory. Generally, the scheduler 120 shown in FIG. 1 represents hardware circuitry that includes and/or is connected with one or more processors (e.g., microprocessors, integrated circuits, field programmable gate arrays, etc.) that perform operations to schedule flows for the TSN 110 as discussed herein. The memory 124 may include one or more computer readable storage media. The memory 124, for example, may store information regarding network and/or component properties, as well as properties of QKD devices. Further, the process flows and/or flowcharts discussed herein (or aspects thereof) may represent one or more sets of instructions that are stored in the memory 124 for direction of operations of the scheduler 120.

Accordingly, in various embodiments the scheduler 120 includes processing circuitry configured to perform one or more tasks, functions, or steps discussed herein. It may be noted that the term "processing unit" or "processor" as used herein is not intended to necessarily be limited to a single processor or computer. For example, the scheduler 120 may include multiple processors, ASIC's, FPGA's, and/or computers, which may be integrated in a common housing or unit, or which may distributed among various units or housings. It may be noted that operations performed by the scheduler 120 (e.g., operations corresponding to process flows or methods discussed herein, or aspects thereof) may be sufficiently complex that the operations may not be performed by a human being within a reasonable time period. For example, the identification of components and connections for an entire TSN along with associated QKD devices (and characteristics and/or capabilities of the QKD devices), the determination of a corresponding topology, and the scheduling of flows for the entire TSN as discussed herein may rely on or utilize computations that may not be completed by a person within a reasonable time period.

The depicted scheduler 120 includes the processor 122 which is configured (e.g., programmed or directed by instructions stored in memory 124) to identify power connections between the plural components 112 of the TSN 110 that are interconnected via the predetermined connection plan. Then, the scheduler 120 (e.g., the processor 122 of the scheduler 120) in various embodiments determines a topology of the components 112 of the TSN 110 based on the power connections. Next, the processor 122 determines QKD information for the components 112 (e.g., identifies which QKD devices are available for and/or associated with particular components, as well as information regarding characteristics of the QKD devices including control parameter settings, key generation rate, or the like), and schedules flows for the TSN 110 based on, or using, the QKD information. Additional details and examples regarding scheduling (e.g., one or more scheduling tasks that may be carried out by the scheduler 120) are discussed in connection with FIG. 2.

Figure 2:
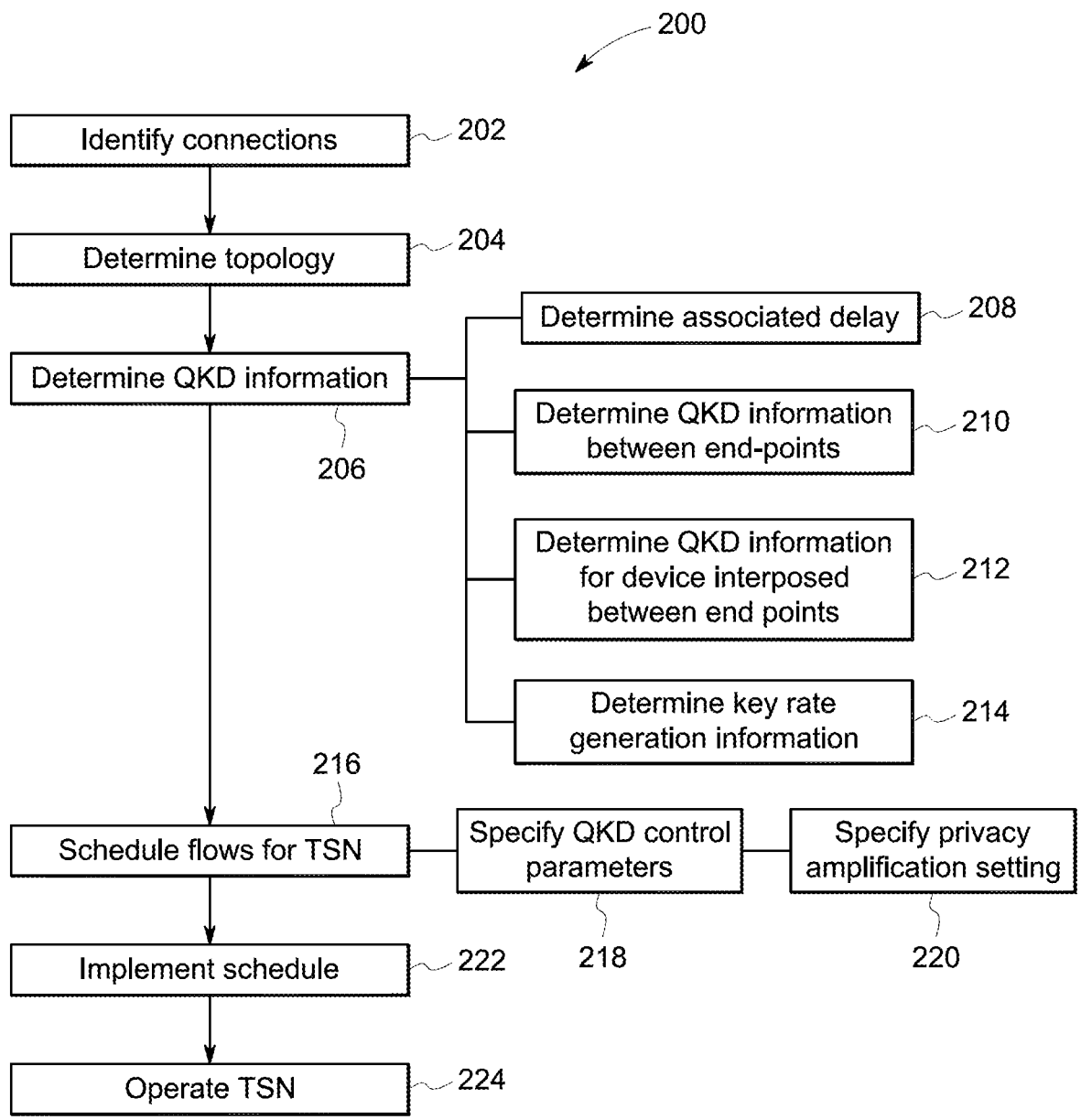
FIG. 2 illustrates a flowchart of one embodiment of a method in accordance with one or more embodiments of subject matter described herein.

FIG. 2 provides a flowchart of a method 200 in accordance with various embodiments. The method 200, for example, may employ or be performed by structures or aspects of various embodiments (e.g., systems and/or methods and/or process flows) discussed herein. In various embodiments, certain steps may be omitted or added, certain steps may be combined, certain steps may be performed concurrently, certain steps may be split into multiple steps, certain steps may be performed in a different order, or certain steps or series of steps may be re-performed in an iterative fashion. In various embodiments, portions, aspects, and/or variations of the method 200 may be able to be used as one or more algorithms to direct hardware (e.g., one or more aspects of the scheduler 120) to perform one or more operations described herein.

At 202, connections (e.g., power connections) are identified between plural components (e.g., components 112) of a TSN (e.g., TSN 110). The connections may be identified autonomously by a scheduler or processing device (e.g., scheduler 120). In various embodiments, the plural components are interconnected by a predetermined connection plan that specifies the power connections between the components. The predetermined plan may be set forth under a guide or standard.

At 204, a topology of the components of the TSN is determined. The topology is determined based on the connections identified at 202. For example, information regarding the power connections may be autonomously acquired from the TSN (or from individual components of the TSN) by a scheduler or processing device, and the power connections identified from the information. Then, a topology of the components may be determined, with the topology linking or associating components together that function together to provide power or perform related tasks. Determining the topology in various embodiments includes generating one or more models (e.g., mathematical models) that depict or describe a relationship among components of the TSN based on power connections between the components.

At 206, quantum key distribution (QKD) information of the components is determined. Generally, the QKD information relates to the components themselves (e.g., identification of components that communicated with each other using QKD security), techniques used to implement QKD for the TSN, and/or devices (e.g., QKD devices 113) used to generate and distribute quantum keys for use with the TSN. For example, the QKD information may include one or more of level of key protection for communication between or among given components (e.g., number of keys used for communications along a route including two or more components). As another example, alternatively or additionally, the QKD information may include control parameters used to control operation of one or more QKD devices and/or delay times resulting from use of QKD along a given route (or potential route). QKD information for a given component or components may include an identification of QKD devices associated with the components and/or a route along which the components are included, as well as the control parameters and/or capabilities (e.g., key generation rate) of the QKD devices. As one more example, in various embodiments QKD information includes an identification of whether or not the quantum channel and message (or classical) channel share the same fiber. It may be noted that the determining of QKD information in various embodiments includes identifying existing QKD information and/or specifying QKD information for one or more QKD devices. For example, in some embodiments a current setting of a control parameter or key generation rate may be identified. In some embodiments, a range of potential key generation rates (and/or a range of values available for one or more control parameters) may be identified and a particular value or value selected (e.g., to balance or trade-off security level vs. available computing resources for a given path or route, and/or to prioritize resources among multiple paths or routes to efficiently allocate available resources).

As discussed above, determining QKD information may include determining an amount of delay caused by the use of QKD along one or more routes or paths. In the illustrated example, at 208, an amount of delay associated QKD (e.g., delay caused by generation, transmission, or use of QKD keys) along at least one path between at least some of the components of the TSN is determined. The amount of delay may be for a path that is already planned to be in use, or may be for a potential path. For example, for a given group of two or more components, multiple potential paths or routes may be analyzed to determine the delay associated with each particular path or route, with one of the routes eventually selected or specified based on the delay time and/or other selection criteria as part of a scheduling process.

As discussed above, QKD information in various embodiments may be determined between end-points of a path and/or for components interposed between end-points of a path. For example, in the illustrated example, at 210, at least some of the QKD information determined at 206 is determined between end-points of at least one path. For example, a delay time between endpoints of an existing route or potential route may be determined. As another example, separate QKD devices may be associated with the endpoints of a route, and the determined QKD information may include information regarding the QKD devices associated with the endpoints, including values (or ranges of available values) for one or more control parameters for the QKD devices.

Figure 3:
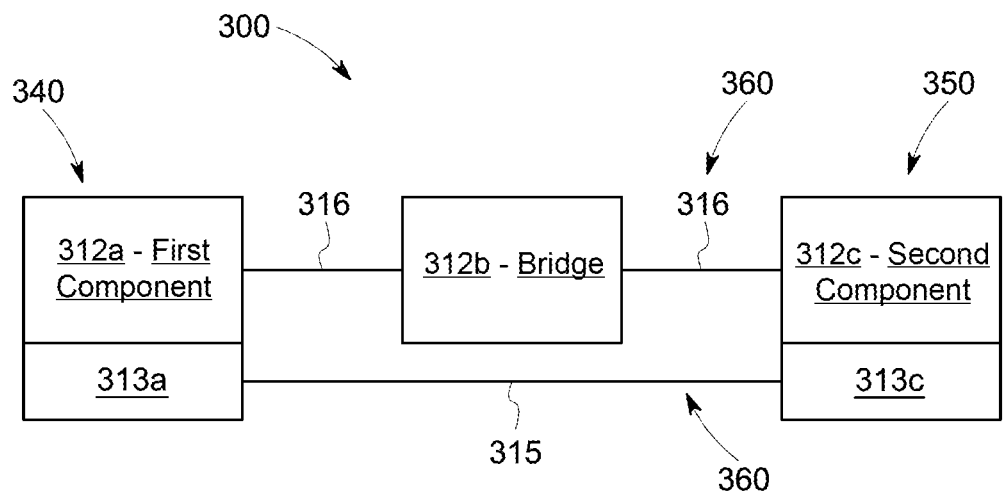
FIG. 3 illustrates an example system including QKD devices in accordance with one or more embodiments of subject matter described herein.

FIG. 3 illustrates an example TSN 300 including components 312 for which QKD information is determined between endpoints. The components 312 of the TSN include a first component 312a representing a first endpoint 340, and a second component 312c representing a second endpoint 350. Interposed between the first component 312a and the second component 312c along a path 360 defined between the first endpoint 340 and the second endpoint 350 is a bridge component 312b. A first QKD device 313a is associated with the first component 312a and a second QKD device 313c is associated with the second component 312c. The first QKD device 313a is utilized to generate, distribute, and/or receive quantum keys over quantum channel 315 for communications associated with the first component 312a (e.g., communications over message channel 316). The second QKD device 313c is associated with the second component 312c, and is utilized to generate, distribute, and/or receive quantum keys over quantum channel 315 for communications associated with the second component 312c (e.g., communications over message channel 316). Accordingly, at 210 of the illustrated embodiment, the determined QKD information determined between endpoints of the path 360 may include information regarding the first QKD device 313a and second QKD device 313c (e.g., values of control parameters and/or key generation rates for the QKD devices). It may be noted that a QKD device located at or associated with an endpoint may additionally communicate with a component that is not at the endpoint. For example, in the depicted example, the bridge component 312b (e.g., a TSN bridge) is interposed between the first component 312a and the second component 312c. A message using QKD security may be sent from the first component 312a to the second component 312c via the bridge component 312b. The QKD devices 313 may provide QKD transmission information (e.g., key rate, key size) for securing the transmission of the message to various components 312. For example, the first QKD device 313a may provide QKD transmission information to the first component 312a of the first endpoint 340, while the second QKD device 313c (which is associated with the second component 312c of the second endpoint 350) may provide QKD transmission information to the bridge component 312b.

Information for QKD devices other than those associated with endpoints may also be determined additionally or alternatively in various embodiments. For example, in the illustrated embodiment, at 212, at least some of the QKD information is determined for at least one component interposed between endpoints of at least one path. For example, a delay time for communications passing through a component interposed between endpoints of an existing route or potential route due to the use of QKD may be determined. As another example, one or more QKD devices may be associated with one or more components disposed between endpoints along a communicative route, and the determined QKD information may include information regarding the QKD devices, including values (or ranges of available values) for one or more control parameters for the QKD devices.

Figure 4:
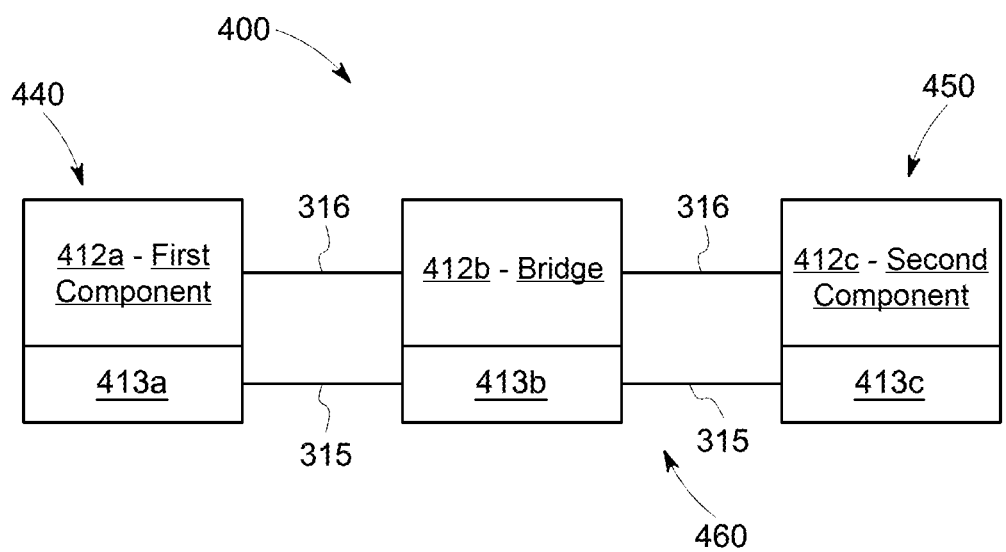
FIG. 4 illustrates another example system including QKD devices in accordance with one or more embodiments of subject matter described herein.

FIG. 4 illustrates an example TSN 400 including components 412 for which QKD information is determined for at least one component interposed between endpoints. The components 412 of the TSN include a first component 412a representing a first endpoint 440, and a second component 412c representing a second endpoint 450, along with a bridge component 412b interposed between the first component 412a and the second component 412c along a path 460 defined between the first endpoint 440 and the second endpoint 450. A first QKD device 413a is associated with the first component 412a, a second QKD device 413c is associated with the second component 412c, and a bridge QKD device 413b is associated with the bridge component 412b. The first QKD device 413a is utilized to generate, distribute, and/or receive quantum keys over quantum channel 415 for communications associated with the first component 412a (e.g., communications over message channel 416). The second QKD device 413c is associated with the second component 412c, and is utilized to generate, distribute, and/or receive quantum keys over quantum channel 415 for communications associated with the second component 412c (e.g., communications over message channel 316). The bridge QKD device 413b is associated with the bridge component 412b, and is utilized to generate, distribute, and/or receive quantum keys over quantum channel 415 for communications passing through the bridge device 412b (e.g., communications over message channel 316). Accordingly, at 212 of the illustrated embodiment, the determined QKD information determined between endpoints of the path 460 may include information regarding the bridge QKD device 313b (e.g., values of control parameters and/or key generation rate for the bridge QKD device 313b). Additionally, the determined QKD information may also include information regarding the first QKD device 313a and/or second QKD device 313c.

As discussed above, the QKD information determined at 206 may include key generation rate data (e.g., a rate at which one or more components are capable of generating quantum keys). Returning to FIG. 2, at 214, key rate generation information is determined. The key rate generation information corresponds to a rate at which keys are generated by at least one QKD device associated with the TSN. For example, for a device that has a fixed rate, the fixed rate may be determined. As another example, for a device that has a variable rate, the available range may be determined. Then, as part of the scheduling process, a specific rate or range of rates within the available range may be specified, for example, to efficiently balance security requirements with available computing resources and/or delay time.

At 216, flows are scheduled for the TSN based on the QKD information of the components. For example, routes may be selected based on the QKD information (e.g., based on key generation rates, key buffer rates or characteristics, and/or other characteristics of QKD devices along the routes) and/or QKD information may itself be specified for a given route (e.g., the value of key generation rate or control parameter for a QKD device may be selected from an available range to meet design objectives). Generally, the schedule in various embodiments specifies which components communicate with other components, the path or route of communication for a given group of components that communicate with each other, an order raking groups of devices based on priority of communication (e.g., which groups' communications take precedence over other groups' communications), and/or a level or type of security utilized (e.g., whether QKD is employed, how many keys are generated for a give route or path, or the like).

Generally, the flows for the TSN may be scheduled by one or more processing units (e.g., by scheduler 120). The flows may be scheduled using a known topology (e.g., the topology determined based on the power connections at 204 of the illustrated example). The flows in various embodiments correspond to routes or paths through Ethernet hardware over various nodes of the system. As also discussed above, the schedule may specify, for a given flow, the components that are part of the flow, the route or path for communications among the components, and the timing for communications along the flow. For example, when scheduling flows for a power grid, a power relay may be identified, and a best available relay controller selected based on predetermined criteria including QKD capabilities associated with the available relay controllers. The relay and relay controller may then be associated with each other and other components (including an egress gate) as part of a scheduled flow. Each route or path may terminate in an egress gate that is normally closed. Generally, only one gate is open at a time to avoid overlap or interference of different communications. The flows may also be prioritized, for example, with some flows identified as best-efforts flows that receive a lower priority as discussed herein. In contrast to conventional approaches that use a slice-by-slice approach or consider flows individually or serially, the scheduling of flows in various embodiments may be performed (e.g., by the scheduler 120) taking into account the entire TSN (or grouped portions thereof) together (e.g., looking at the QKD capabilities and characteristics associated with large numbers of components as a whole). For example, paths with greater QKD capabilities may be identified and assigned to components for which greater security is desirable.

As discussed herein, in various embodiments, control parameters and/or key generation rates for one or more QKD devices may be specified or selected as part of scheduling the flow (e.g., a value for one or more control parameters and/or key generation rate may be selected from an available range of available values for one or more QKD devices associated with components defining a given path or route). In the illustrated example, at 218, QKD control parameters for QKD devices associated with the components of the TSN are specified. For example, at 220, a privacy amplification setting for at least one QKD device is specified. Generally, privacy amplification settings for QKD devices in various embodiments are used to specify a trade-off between key generation and length with a desired level of security. For example, key lengths may be compressed utilizing various mathematical techniques to compensate for non-ideal behavior of quantum key device componentry (e.g., misaligned beam splitters, inefficiencies in photonics devices, or the like).

At 222, the schedule is implemented in the TSN, and at 224, the TSN is operated pursuant to the schedule. For example, the schedule is utilized to facilitate communications among the various components to deliver information with high precision and security.

In one embodiment, a method includes identifying connections between plural components of a time sensitive network (TSN) that are interconnected via a predetermined connection plan. The method also includes determining quantum key distribution (QKD) information of the components. Also, the method further includes scheduling flows for the TSN based on the QKD information of the components.

In one example, the method further includes specifying QKD control parameters for QKD devices associated with the components.

In one example, specifying QKD control parameters includes specifying at least one privacy amplification setting for at least one QKD device.

In one example, determining QKD information includes determining an amount of delay associated with QKD along at least one path between at least some of the components.

In one example, at least some of the QKD information is determined between end-points of at least one path.

In one example, at least some of the QKD information is determined for at least one component interposed between end-points of at least one path.

In one example, the QKD information includes key rate generation information corresponding to a rate at which keys are generated by at least one QKD device associated with the TSN.

In one embodiment, a scheduler is configured for use with a time sensitive network (TSN). The scheduler includes one or more processors configured to identify connections between plural components of the TSN that are interconnected via a predetermined connection plan; determine quantum key distribution (QKD) information of the components; and schedule flows for the TSN based on the QKD information for the components.

In one example, the one or more processors are further configured to specify QKD control parameters for QKD devices associated with the components.

In one example, the one or more processors are further configured to specify at least one privacy amplification setting for at least one QKD device.

In one example, the one or more processors are further configured to determine an amount of delay associated with QKD along at least one path between at least some of the components.

In one example, the one or more processors are configured to determine at least some of the QKD information between end-points of at least one path.

In one example, the one or more processors are configured to determine at least some of the QKD information for at least one component interposed between end-points of at least one path.

In one example, the QKD information includes key rate generation information corresponding to a rate at which keys are generated by at least one QKD device associated with the TSN.

In one embodiment, a system includes a time sensitive network (TSN), plural quantum key distribution (QKD) devices, a scheduler, and a communication network. The TSN includes plural components that are interconnected via a predetermined connection plan. The QKD devices are associated with the plural components of the TSN. The scheduler is configured for use with the TSN, and includes one or more processors configured to identify connections between the plural components of the TSN that are interconnected via a predetermined connection plan; determine quantum key distribution (QKD) information of the components; and schedule flows for the TSN based on the QKD information for the components. The communication network couples the scheduler and the TSN.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid-state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, limitation, or element that is described as being "configured to" perform the task or operation. For example, a processing unit, processor, or computer that is "configured to" perform a task or operation may be understood as being particularly structured to perform the task or operation (e.g., having one or more programs or instructions stored thereon or used in conjunction therewith tailored or intended to perform the task or operation, and/or having an arrangement of processing circuitry tailored or intended to perform the task or operation). For the purposes of clarity and the avoidance of doubt, a general purpose computer (which may become "configured to" perform the task or operation if appropriately programmed) is not "configured to" perform a task or operation unless or until specifically programmed or structurally modified to perform the task or operation.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A method comprising:
   identifying connections between plural components of a time sensitive network (TSN) that are interconnected via a predetermined connection plan;
   determining a range of potential quantum key distribution (QKD) key generation rates of the components; and
   scheduling flows for the TSN, wherein scheduling flows comprises scheduling timing at which to transmit messages within the TSN and further comprises selecting a key generation rate for QKD devices associated with the components from within the determined range of potential QKD key generation rates by selecting a physical length of a communicative path between QKD devices to achieve a desired key generation rate.

2. The method of claim 1, further comprising specifying QKD control parameters for QKD devices associated with the components.

3. The method of claim 2, wherein specifying QKD control parameters comprises specifying at least one privacy amplification setting for at least one QKD device.

4. The method of claim 1, further comprising determining an amount of delay associated with QKD along at least one path between at least some of the components.

5. The method of claim 1, wherein at least some of the potential QKD key generation rates are determined between end-points of at least one path.

6. The method of claim 1, wherein at least some of the potential QKD key generation rates are determined for at least one component interposed between end-points of at least one path.

7. A scheduler configured for use with a time sensitive network (TSN), the scheduler including one or more processors configured to:
   identify connections between plural components of the TSN that are interconnected via a predetermined connection plan;
   determine a range of potential quantum key distribution (QKD) key generation rates of the components; and
   schedule flows for the TSN, wherein scheduling flows includes scheduling timing at which to transmit messages within the TSN and further includes selecting a key generation rate for QKD devices associated with the components from within the determined range of potential QKD key generation rates by selecting a physical length of a communicative path between QKD devices to achieve a desired key generation rate.

8. The scheduler of claim 7, wherein the one or more processors are further configured to specify QKD control parameters for QKD devices associated with the components.

9. The scheduler of claim 8, wherein the one or more processors are further configured to specify at least one privacy amplification setting for at least one QKD device.

10. The scheduler of claim 7, wherein the one or more processors are further configured to determine an amount of delay associated with QKD along at least one path between at least some of the components.

11. The scheduler of claim 7, wherein the one or more processors are configured to determine at least some of the potential QKD key generation rates between end-points of at least one path.

12. The scheduler of claim 7, wherein the one or more processors are configured to determine at least some of the potential QKD key generation rates for at least one component interposed between end-points of at least one path.

13. A system comprising:
a time sensitive network (TSN) comprising plural components that are interconnected via a predetermined connection plan;
plural quantum key distribution (QKD) devices associated with the plural components;
a scheduler configured for use with the TSN, the scheduler including one or more processors configured to:
identify connections between the plural components of the TSN that are interconnected via a predetermined connection plan;
determine a range of potential quantum key distribution (QKD) key generation rates of the components; and
schedule flows for the TSN, wherein scheduling flows includes scheduling timing at which to transmit messages within the TSN and further includes selecting a key generation rate for QKD devices associated with the components from within the determined range of potential QKD key generation rates by selecting a physical length of a communicative path between QKD devices to achieve a desired key generation rate; and
a communication network that couples the scheduler and the TSN.

14. The system of claim 13, wherein the one or more processors are further configured to specify QKD control parameters for the QKD devices associated with the components.

15. The system of claim 14, wherein the one or more processors are further configured to specify at least one privacy amplification setting for at least one of the QKD devices.

16. The system of claim 13, wherein the one or more processors are further configured to determine an amount of delay associated with QKD along at least one path between at least some of the components.

17. The system of claim 13, wherein the one or more processors are configured to determine at least some of the potential QKD key generation rates between end-points of at least one path.

18. The system of claim 13, wherein the one or more processors are configured to determine at least some of the potential QKD key generation rates for at least one component interposed between end-points of at least one path.

* * * * *